United States Patent [19]

Maget

[11] 4,118,299

[45] Oct. 3, 1978

[54] ELECTROCHEMICAL WATER DESALINATION PROCESS

[76] Inventor: Henri Jean Robert Maget, 80 Arbuelo Way, Los Altos, Calif. 94022

[21] Appl. No.: 815,663

[22] Filed: Jul. 14, 1977

[51] Int. Cl.² ............................................. B01D 13/02
[52] U.S. Cl. .............................. 204/180 P; 204/1 R; 204/101; 204/129; 204/265
[58] Field of Search ............... 204/180 P, 301, 1 R, 204/101, 129, 258, 265

[56] References Cited

U.S. PATENT DOCUMENTS

| | | | |
|---|---|---|---|
| Re. 26,913 | 6/1970 | Lewis et al. | 204/101 |
| 3,117,034 | 1/1964 | Tirrell | 204/265 X |
| 3,262,868 | 7/1966 | Juda | 204/265 X |
| 3,282,834 | 11/1966 | Justi et al. | 204/1 R X |
| 3,322,574 | 5/1967 | Justi et al. | 204/180 P X |
| 3,379,634 | 4/1968 | Rutkowski | 204/258 |
| 3,475,302 | 10/1969 | Langer et al. | 204/180 P X |
| 3,969,201 | 7/1976 | Oloman et al. | 204/1 R X |

Primary Examiner—Arthur C. Prescott

[57] ABSTRACT

A process is provided for purifying salt-containing water into desired form, wherein a salt-containing water stream is mixed with hydrogen and then pumped into an electrochemical cell where hydrogen is ionized into protons. These protons migrating to the counter-electrode, under the influence of an applied potential, entrain liquid water. At the counter-electrode, protons recombine to form hydrogen while releasing liquid water. Hydrogen is recycled and participates into the process only as a vehicle for the transport of water. This process is particularly applicable to the purification of water with high salt content such as sea water.

Apparatus for carrying out the above process is also provided.

5 Claims, 8 Drawing Figures

ELECTROCHEMICAL WATER DESALINATION PROCESS

FIELD OF THE INVENTION

The present invention relates to a process and apparatus for the purification of salt-containing water into desired water and to apparatus for carrying out such process. More particularly, the present invention is directed to an electro-osmotic process and apparatus for removing pure water from salt-containing water such as sea water, brackish water and mineralized water.

BACKGROUND OF THE INVENTION

High salt-containing water is available worldwide in sea water, underground water and other sources. These sources of water, although available in great abundance are practically useless because high-salt content water is non-potable, therefore unfit for human and animal consumption or the chemical species constituting the salt is toxic to vegetation, therefore rendering the water unsuitable for crops, fruit trees or any other vegetal growth or the high salt content renders the water corrosive, therefore rendering the water unsuitable for industrial use lest corrosion of equipment, pipes and other metal parts would require frequent and costly replacement of such metal parts, components or equipment.

In as much as the world is in short supply of water fit for human, animal, vegetal consumption and suitable for industrial processes, cooling, steam generation, washing, dluting, etc., in most instances the salt-containing water available in large supply, is totally useless, unless the salts are removed, in part or almost totally, and useful, low-salt containing water is produced for human, animal, vegetal consumption and for industrial uses. Many methods have been proposed for eliminating, in part, salt from salt-containing water. These methods can be classified into two major groups: methods to remove water from the salt-containing impure water and methods for removing salts from the salt-containing water. The best known first-method processes are reverse osmosis and flash distillation. The best known second-method process is electrodialysis.

The process of reverse osmosis for purification of salt water makes use of plastic films which sorb a solvent but little or none of the solutes contained herein. Reverse osmosis films or membranes strongly absorb water so that electrolytes and solutes cannot permeate the membrane. Accordingly, water can be pumped across the membrane under pressure while solutes are rejected. These membranes are permeable only to water, except that low molcular weight solutes such as methanol and urea can diffuse across them. The membrane hydraulic resistance is high because they do not contain pores as such, but this defect is circumvented by making the membrane very thin and supporting it appropriately. Membranes of this class include cellulose acetate, polyamies and a few other substances. Distillation is a method for water desalination wherein the salt-containing water is heated, evaporated and condensed, thus producing pure water while leaving a high salt-containing residue. This process in as much as it involves evaporation is very energy-demanding and also produces a high salt-containing residue which is corrosive to pipes, pumps, valves, heat exchangers and other metal parts and components.

Another method for water desalination is based on electrodialysis. In the electrodialysis process, salt-containing water streams are passed between alternating pairs of cation- and anion-permeable membranes which control the migration of these ions from one compartment to another under the influence of an electric field. Electrodialysis membranes are particularly useful for the concentration of electrolytes.

Two of the previously described processes, reverse osmosis and electrodialysis make use of membranes. One of the principal advantages to membrane processes is the fact that they do not require a phase change for processes of separation as do flash vaporization and freezing. Accordingly, they have energy requirements not too far removed from those of maximum efficiency or thermodynamic reversibility. They do require very much less energy then do the more conventional separation processes of distillation and freezing. Although equipment costs for electrodialysis are higher than for distillation, its overall costs due to its low energy requirements make the process more acceptable. At the current fuel prices, electrodialysis is strongly favored over flash vaporization. Pressure-driven membranes are not efficient at very high driving pressures (over 1000 psi) because of equipment failure and high cost, so systems where a high osmotic concentration gradients occurs are uneconomical.

Major problems in the development of new energy resources arise during the conversion of coal into convenient fuels or through combustion to produce steam. These processes require substantial amounts of water and most of these fuels are found in arid regions. Water is also required in arid regions to restore strip mining regions to their original state. Purification processes will allow the limited amounts of water available to be reused many times and help make the processes economically feasible.

The survival of millions of people, worldwide, is dependent on the production rate and efficiency in producing food crops. Crop growth is largely dependent on irrigation and multiple re-use of the water often available in limited supply. In most arid parts of the world, including the United States of America, soil fertility is dependent on water supply, therefore the current projects for irrigation if vast arid areas in Arizona, New Mexico, California and other States, where high yield crops are possible if irrigation is conducted. This observation applies also to all inhabited continents where adequate food supply could be produced if adequate water supply was available. Often sea water or underground water is available but unsuitable for irrigation. Therefore economical process to convert these salt-containing water supplies into useable water are in great need.

If the world is to produce energy from the sun via photosynthesis, this would require a vast expansion of irrigation in sun-rich, therefore also often water-deficient areas. Desalination processes will have an important part in removing salts and producing pure water for re-use.

Accordingly, it is clear that, in addition to prior art processes, new efficient and economical processes are needed to provide low-salt contaning water with ever-increasing demand.

SUMMARY OF THE INVENTION

It has now been found that salt-containing water, such as sea water, brackish water and mineralized water can be purified to a useful water product, efficiently without the disadvantages associated with prior art processes.

The process for purifying salt-containing water, in accordance with the present invention, comprises mixing the impure water stream with hydrogen gas stream. The electrochemical treatment consists of ionizing gaseous hydrogen into protons and forcing protons to flow to a counter-electrode under the influence of an applied voltage. During protonic flow, water is entrained and moving to the counter-electrode with the protons. At the counter-electrode protons are recombined into hydrogen. The hydrogen is further electrochemically compressed at the counter-electrode provoking the liberation of liquid water. The resulting gaseous hydrogen is used to initiate a new cycle. The process as described consists therefore of three steps: hydrogen-water mixing, electro-osmotic water transport in an electrochemical cell and water recovery, with the exception that all three steps are carried-out in one single apparatus.

The process of mixing hydrogen with salt-containing water can be achieved through humidification (bubbling hydrogen through the water or flowing hydrogen over a sheet of water or flowing hydrogen over wetted wicks) or through simultaneous adsorption of hydrogen on suspended slurry in water. The slurry now containing hydrogen adsorbed on the solid particles can be used as an electrode in the electro-osmotic cell. Until now, the use of slurry or dispersed-type electrodes was limited solely to theoretical scientific experimental functions as described in the paper entitled "The Dispersed Electrode" presented at the October 1966 Meeting of the Electrochemical Society, Philadelphia, Pa., by the applicant and in a practical industrial application described in U.S. Pat. No. 3,824,163 to Henri J. R. Maget disclosing the use of surries in an "Electrochemical Sulfur Dioxide Abatement Process". It will be appreciated that a variety of means to supply water to the ionized hydrogen can be conceived.

The process of electro-osmosis resulting in the flow of water from an electrode to a counter-electrode under the influence of an applied voltage, is carried-out with two electrodes (an anode and a cathode as counter-electrode) separated by a cation exchange membrane. Electrodes can be of the porous conventional flow-by type or of the dispersed, slurry types. The cation exchange membrane is an important element in the process, since through its physical and chemical properties, it will prevent salt-containing water to flow directly to the counter-electrode (without undergoing the change from hydrogen gas to protons), will also prevent dissolved salts in the salt-containing water to migrate to the counter-electrode and will also provide a physical barrier between anode and cathode, thereby preventing mixing of impure and pure water streams. The transport of water under these particular conditions, called electro-osmosis, was considered to-date as a detrimental process in fuel cells as reported by the applicant in the "Handbook of Fuel Cell Technology" — Chapter on "The Iron Exchange Membrane Fuel Cell", Prentice-Hall, 1968, requiring water transported electro-osmotically from hydrogen to oxygen electrodes to be recirculated in order to prevent drying-out of the membrane. It was not appreciated that electro-osmosis could serve a practical industrial purpose to purify water.

The third process, water recovery, is based on the electrochemical compression of hydrogen. Under the influence of an applied voltage hydrogen can be transported from a low pressure environment to a high pressure environment. This action, similar to a pumping process, was disclosed by the applicant in U.S. Pat. No. 3,489,670 "Process For Gas Purification" for purpose of purifying hydrogen. It was nor appreciated that the electro-osmotic step could be combined with hydrogen compression to transport water and subsequently separate the hydrogen gas phase from the pure water liquid phase.

What is appreciated now is the use of an efficient hydrogen electrode (stationary, flow-by or dispersed) in conjunction with electro-osmosis, hydrogen compression and water recovery.

Furthermore it is appreciated that the two most important process steps, electro-osmosis and electrochemical water recovery, are conducted with the use of hydrogen electrodes in an acidic environment. It is also recognized by persons familiar with electrochemistry that electrochemical hydrogen oxidation and reduction are nearly reversible and that hydrogen electrodes operate near thermodynamic equilibrium, which signifies that the energy requirements to perform these processes will be considerably lower than the more irreversible processes such as mechanical, thermal or thermo-mechanical processes.

The process of the invention is particularly adapted for efficient removal of pure water from salt water and electrochemical recovery of liquid water. The process of the invention can be so employed regardless of the concentration of salts. The process can also be employed for the concentration of aqueous solutions, whereby the water from dilute solutions is removed via electro-osmosis, leaving a concentrated residue.

Further and in accordance with the present invention, apparatus is provided for the mixing of hydrogen and salt-containing water, removal and recovery of desired purified water, comprising hydrogen-water mixing means for contacting gaseous hydrogen with liquid water, said apparatus consisting of scrubber or wetting wicks or solid particles suspended in salt-containing water allowing adsorption of hydrogen; an electro-osmotic cell to effect ionization of hydrogen to protons and transport of pure water while preventing salts to be entrained, said electro-osmotic cell comprising an anode, a cathode and an electrolyte, one of said anode and cathode comprising a stationary electrode and the other electrode comprising a stationary electrode or a slurry electrode, said electro-osmotic cell further comprising a cation exchange membrane to allow proton transfer while preventing mixing of impure with pure water; and an electrochemical compression chamber for the separation of liquid water and recycling of hydrogen to the anode, said cell comprising a cathode for hydrogen release, pressure valves to allow higher cathode pressures and to permit hydrogen gas recycle to the anode and pure water evacuation.

The above apparatus may optionally include means for mixing the slurry anode to maintain particles in suspension, in- and outlets for the salt-containing feed and filters to prevent slurry particles to leave the anode chamber. The above apparatus may also include pump or pumps to flow a stream of impure water into the electro-osmotic cell and to evacuate pure water from the counter-electrode compartment.

The term "slurry"-, "dispersed" or "moving" electrode as employed herein refers to the aqueous slurry of particles having hydrogen absorbed hereon. The term "salt-containing" and "impure" water as employed herein refers to water containing a variety of inorganic or organic salts at various levels of concentration. The term "pure" water refers to water containing a lower salt level concentration as compared to "salt containing" or "impure" water.

Perhaps the main advantage of the process and apparatus of the invention is its flexibility in being capable of handling substantially any type of salt-containing water regardless of the salt concentration therein as opposed to prior art systems capable of handling water of only very specific salt concentrations. Other main advantages of the process and apparatus are the ability to integrate all process steps into a single apparatus and the use of quasi-reversible electrochemical cell reactions and electro-osmotic phenomena, which render the water desalination process very economical with regard to energy requirements. Thus, when many purification processes are specifically talored to water salt composition and concentration, such as salt water with high sodium cloride content, as compared to underground mineral water with high magnesium or iron chloride content, the process described herein is rather insensitive to ionic salt species since the cation exchange membrane will selectively discriminate against all cations except protons. Furthermore, cation exchange membranes, if contaminated by other cations, can be easily restored to their original state by treatment with a slightly acidic solution which will exchange foreign cations to the desired protons, required for the electro-osmotic process. It should be further noted that neither cathode nor anode require elevated operational pressures. In the process described herein, efficient water recovery can be achieved for total pressures of less than 10 atmospheres, dependent on salt-containing feed stream temperature. Therefore no component in the apparatus will be exposed to high pressures which results in lower component costs. Furthermore, at these pressures hydrogen can be easily recycled to the anode, the pressure being adequate to overcome apparatus pressure drops. No auxiliary means to compress or recycle hydrogen will be required. This low pressure capability results in an additional advantage, namely the ability to use extremely thin membranes readily capable to withstand these low pressures. Obviously, the ability to decrease membrane thickness offers the added advantage of low resistance to protonic flow which is directly proportional to membrane thickness. It is apparent from these observations that the process offers considerable technological opportunities for efficiency and low cost components.

The electrochemical portion of this invention, namely electro-osmotic water transport and electrochemical hydrogen compression makes use of very efficient hydrogen electrodes (anode and cathode) therefore the energy requirements for water transport and water recovery can be maintained at very low levels, a considerable process advantage over mechanical, thermal or thermo-mechanical processes.

Furthermore, the use of the slurry, dispersed or moving electrode in the electro-osmotic step is far more efficient than conventional electrodes. This enhanced efficiency is the result of a more effective utilization of all slurry particles as compared to the presence of inert areas in conventional porous electrodes. It should be further noted that the process, contrary to electro-dialysis, removes water from the salt-containing water feed, therefore rendering it insensitive to feed composition, whereas electrodialysis is based on the elimination of ionic salt species from the impure water, therefore rendering it sensitive to salt concentration in the impure water feed stock.

The principal barriers to the utilization of membrane technologies heretofore has been the fouling of almost all membrane types. Dissolved solutes and colloidal matter from the solution become deposited on the surface or within the pores of the membrane to reduce solvent flux. Fouling is unvariable manifested by a loss in permeability or conductivity. It has been reported in the technical literature that non-fouling membranes can be prepared from polymeric sulfonic acid such as polystyrenesulfonic acid polymers which can operate for years without pretreatment of the feed stream or any regenerative processes. It will be appreciated that cation exchange membrane-types which can be used in the process described herein are polymeric sulfonic acid membranes and more specifically can be polystyrenesulfonic acid polymers. With reference to the ion exchange membrane material, it may consist of any of the well known cation or anion exchange membranes. For example, cation exchange membranes formed of materials such as phenol aldehyde sulfonic acid, polystyrene divinylbenzene sulfonic acid, perfluorinated polyethylene sulfonic acid and phenol formaldehyde carboxylic acid may be employed.

The thickness of the membrane employed in the practice of this invention is not critical. It may vary from several mils to a quarter of a mil or more. However, for economic reasons, the membranes are preferably as thin as possible, for example from about a fraction of a mil to 10 mils.

Cation exchange membranes operate best at neutral or acidic $p_H$ as expected from the presence of acidic functional groups attached to the polymeric chain. In applications using salt-containing water displaying appreciable water alkalinity, pretreatment of the water with a low cost industrial acid such as sulfuric acid will result in increased electro-osmitic cell efficiency.

The electrochemical portion of the present invention can be carried out employing relatively low temperatures as compared to the temperatures necessary in carrying out prior art electrolytic processes. In addition, the invention is based on hydrogen oxido-reduction rather than true electrolysis, and thus requires considerably less parasitic power as compared to prior art systems.

DESCRIPTION OF THE FIGURES

The process and apparatus of the invention are illustrated in the accompanying figures wherein:

Referring to the figures, FIG. 1 illustrates a system applicable to the purification of salt-containing water into purified water. FIG. 1 illustrates the three basic process steps and apparatus elements; hydrogen mixing with salt-containing water in the humidification unit, electro-osmotic water transport in the electro-osmotic cell and water recovery in the water recovery unit. Humidification unit 10 includes inlets for salt-containing feed 11 and hydrogen recycle 12 and outlets for humidified hydrogen 13 and effluent water stream 14. The humidification unit 10 can take the form of any conventional apparatus described in any of the prior art patents referred to hereinbefore as will the apparatus for any one skilled in the art.

Figure 1:
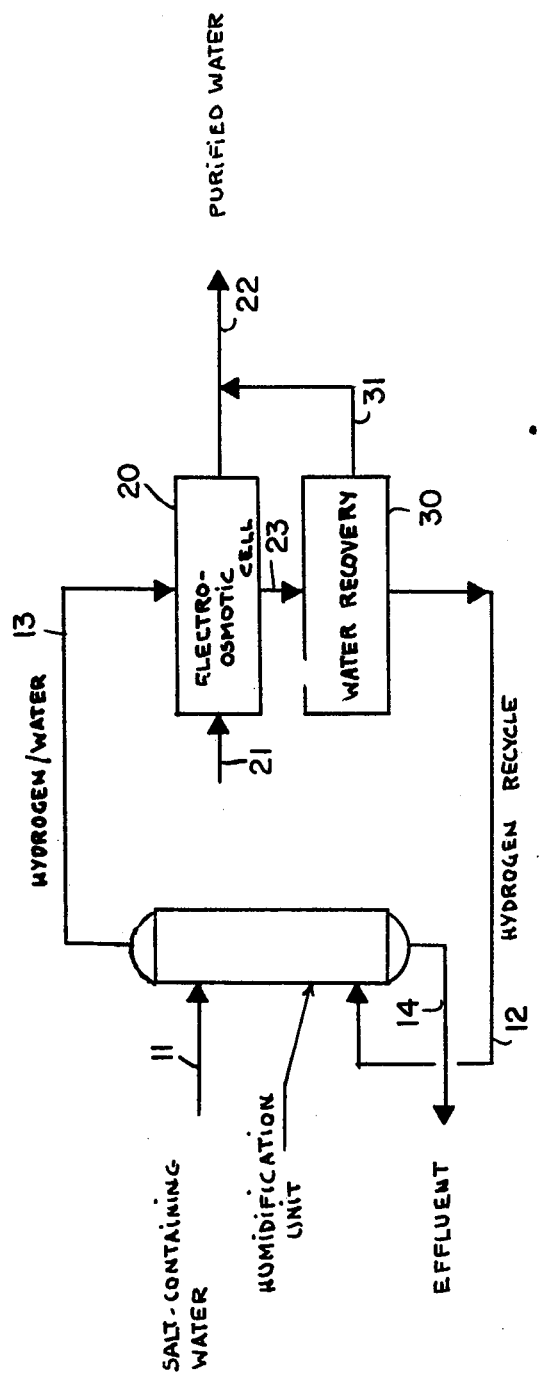
FIG. 1 represents a flow diagram of one embodiment of the process and apparatus of the invention used in humidifying hydrogen with impure water, electro-osmotically transporting water, recovering water and recycling hydrogen.

Electro-osmotic cell 20 is provided with a power source 21 and outlets for purified water 22 and hydrogen- pure water mixture 23. A detailed description of the electro-osmotic cell is set out hereinafter. Water recovery means 30 for separating water from hydrogen include inlet for hydrogen-water mixture 23 and outlets for dehumidified hydrogen in the hydrogen recycle stream 12 and pure water 31 which is added to water 22 already extracted from the electro-osmotic cell 20.

Figure 2:
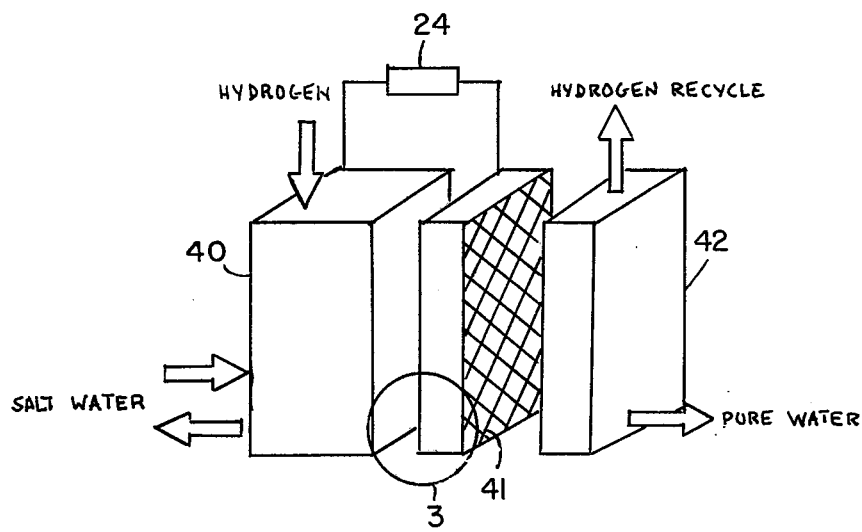
FIG. 2 is a schematic drawing of the electro-osmotic cell employed in the flow diagram of FIG. 1.

The electro-osmotic cell employed in FIG. 1 is shown schematically in FIG. 2 and includes an anode compartment 40 with salt-containing water effluent outlet and hydrogen recycle inlet, cation exchange membrane separator or other diaphragm means 41 for separating the products of the anode and the cathode, a counter-electrode such as hydrogen electrode 42 which functions as a cathode. DC power source 24 is operatively connected to the anode 40 and the cathode 42. The iron exchange membrane 41 employed herein is generally a cation permselective membrane commonly of the type consisting of cation exchange substance in the form of thin sheets; said membranes being substantially hydraulically impermeable to water and to ions carrying a positive charge. The art contains many examples of cation exchange materials which can be formed into cation permselective membranes. Cation membranes are conventional self-supporting sulfonic acid type membranes which are well known in the art or thin cation membranes supported by other means to provide structural integrity. Examples of supporting means are metal screens or porous inert sheets of paper, synthetic materials or any equivalent means. The cell compartments which form anode and cathode containers can be made up of any salt restraint materials such as metals or plastics.

Figure 3:
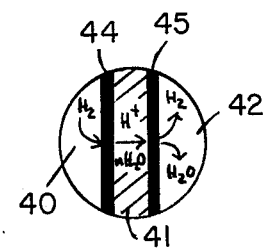
FIG. 3 displays details of hydrogen migration in the electro-osmotic cell.

FIG. 3 provides details of the electro-osmotic cell. Hydrogen from anode compartment 40 is ionized to protons in the sandwich-like membrane electrode structure 41 at the anode 44 in presence of salt-containing water, which enters and exits the anode compartment at $Sw_i$ and $Sw_o$, respectively. Ionized hydrogen, or protons, entrain water while crossing the cation exchange membrane. Recombination at the counter-electrode or cathode 45 of protons produces a mixture of hydrogen and pure water in the cathode compartment 42.

Figure 4:
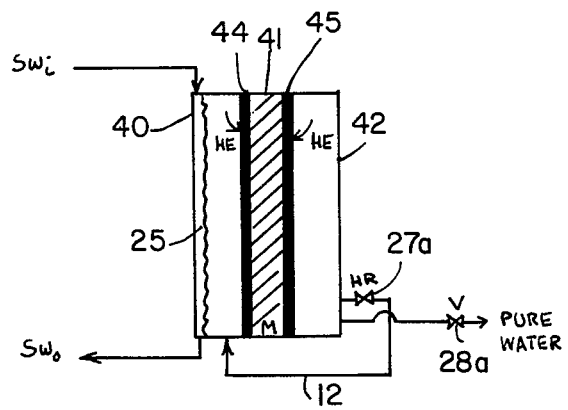
FIG. 4 shows an enlarged sectional view of an electro-osmotic cell wherein salt-containing water is fed as a continuous water layer over which counter-currently hydrogen is passed.
Figure 5:
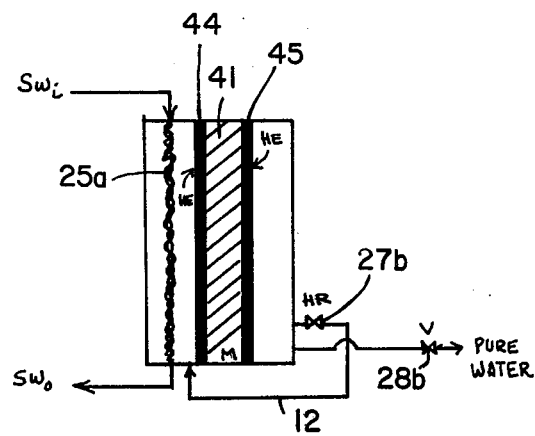
FIG. 5 shows another embodiment of the electro-osmotic cell wherein a wick is used to humidify the hydrogen stream.
Figure 6:
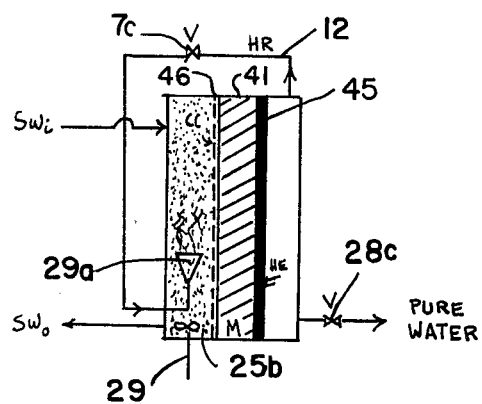
FIG. 6 still shows another embodiment of the electro-osmotic cell wherein the salt-containing water and gaseous hydrogen are fed into a slurry.

FIGS. 4, 5, and 6 illustrate the integrated three-step process into a single apparatus envisioned to become the principal means of practicing the present invention.

Figure 7:
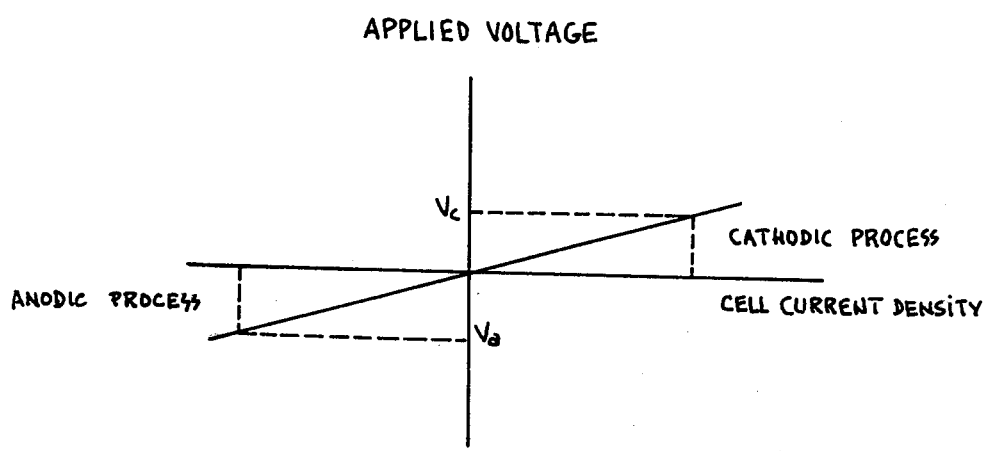
FIG. 7 shows the linear relationship. descriptive of anodic and cathodic processes.
Figure 8:
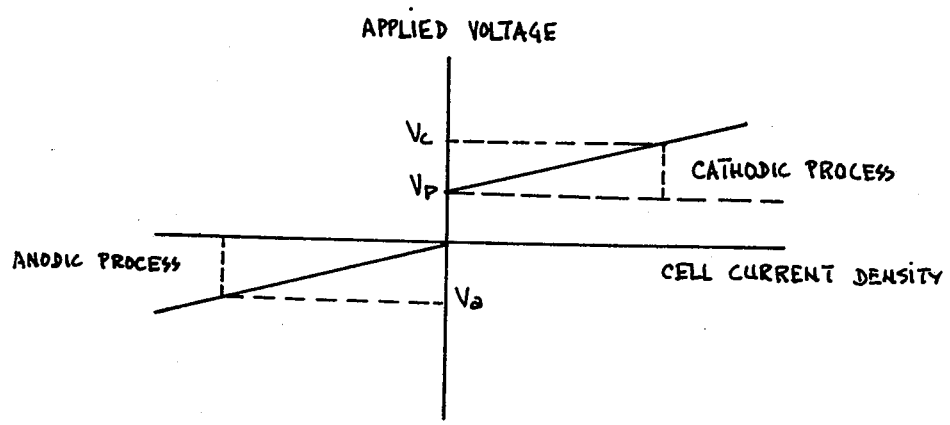
FIG. 8 illustrates the effect of the additional voltage for electro-chemical hydrogen compression.

FIGS. 7 and 8 illustrate the linear relationship, descriptive of the anodic and cathodic processes.

FIG. 4 is a diagrammatic illustration of an integrated apparatus in which salt-containing water, entering the anode compartment at $Sw_i$ and exiting it at $Sw_o$, is allowed to flow in the form of a sheet 25 in the anode compartment while hydrogen is recycled 12 countercurrently to the impure water flow, thereby humidifying hydrogen, a process symbolically represented as:

$$H_2 + 2n\ H_2O \rightarrow H_2, 2n\ H_2O \quad \text{Eqn. 1}$$

Humidified hydrogen is ionized at the hydrogen anode (HE) 44 according to the following step:

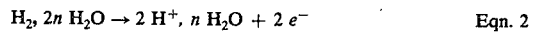

$$H_2, 2n\ H_2O \rightarrow 2\ H^+, n\ H_2O + 2\ e^- \quad \text{Eqn. 2}$$

where $n$ represents the electro-osmotic water transport number, also called Faradaic transport number, a figure of merit for the process described herein showing the number of water molecules transported for each proton. The electro-osmotic transport number may vary from 0 to 8, generally from 2 to 6, depending on cation exchange membrane properties. Protons surrounded by water molcules migrate across the cation membrane (M) 41 to counter-electrode (HE) 45 which is a cathode at which the followng process takes place:

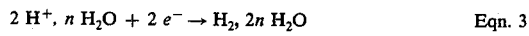

$$2\ H^+, n\ H_2O + 2\ e^- \rightarrow H_2, 2n\ H_2O \quad \text{Eqn. 3}$$

Hydrogen and pure water are discharged in cathode compartment 42 which is maintained under electro-chemically induced hydrogen pressure to separate gaseous hydrogen from liquid water. Under these conditions of hydrogen pressurization the following process of dehumidification will take place:

$$H_2, 2n\ H_2O \rightarrow H_2 + 2n\ H_2O \quad \text{Eqn. 4}$$

Pressure is maintained in the cathode cathode compartment through hydrogen recycle valve (HR) 27a and water separation control valve (V) 28a. Hydrogen recycle valve (HR) 27a controls hydrogen recycle flow and pressure drop to the anode compartment 40 while control valve (V) 28a allows pure water evacuation while preventing hydrogen to be removed from the system. The over-all process reaction, representing the summation of all prevous equations 1, 2, 3 and 4 becomes:

$$H_2 + 2n\ H_2O \rightarrow H_2 + 2n\ H_2O \quad \text{Eqn. 5}$$

Equation 5 represents the systems balance and the transport of water from the anode to the cathode of the electro-osmotic cell, albeit the cathode being at a higher pressure than the anode, said pressure difference being also representative of the theoretical work required to pump humidified hydrogen across the electro-osmotic cell and recovering water from the hydrogen at the anode.

FIG. 5 is illustrative of the same principle described for FIG. 4; although in FIG. 5 a wick (W) 25a is used to humidify hydrogen countercurrently. Valves (HR) 27b and (V) 28b are control valves. Valve (HR) 27b maintains hydrogen over-pressure at the cathode (HE) 45 while valve (V) 28b allows pure water evacuation under cathode over-pressure. Salt water enters the anode compartment at $Sw_i$ and exits it at $Sw_o$. The hydrogen anode is shown as (HE) 44.

FIG. 6 is another illustration of the principle described previously. In this embodiment, a slurry electrode 25b consisting of finely divided anode material suspended in salt-containing water is used in the anode compartment. The slurry can be agitated mechanically through stirrer 29 or can also be agitated through hydrogen bubbler 29a used to disperse recycle hydrogen 12 and to maintain the slurry in suspension. The current is applied through current collector (CC) 46. Electron transfer will occur during contacts of the dispersed particles with the current collector. Valves (V) 27c and (V) 28c are control valves. Valve (V) 27c maintains hydrogen over-pressure at the cathode and controls the flow of recycled hydrogen; valve (V) 28c allows pure water evacuation while maintaining cathode hydrogen over-pressure. After evolution from the hydrogen cathode HE) 45, hydrogen is recycled through hydrogen recycle (HR) line. Salt water enters and exits the electrochemical cell at $Sw_i$ and $Sw_o$, respectively.

In the practice of the system of the invention one of the process advantages is the quasi-reversible behavior of both hydrogen electrodes, anode and cathode. In the case of hydrogen, the dissociation and recombination reactions symbolically represented in Eqn. 6 and Eqn. 7, respectively, are:

at the anode $$H_2 \rightarrow 2 H^+ + 2 e^- \qquad \text{Eqn. 6}$$

at the cathode $$2 H^+ + 2 e^- \rightarrow H_2 \qquad \text{Eqn. 7}$$

and occur nearly reversibly, so that energy requirements are very small. The transfer rate remains essentially proportional to the applied potential, as illustrated in FIG. 7, which shows this linear relationship, descriptive of anodic and cathodic processes. With hydrogen gas treatment, using an ion exchange membrane as the electrolyte, it has been shown that overvoltages as low as 10 millivolts can be associated with the current densities of 100 milliamperes per square centimeter. These overvoltages are identical for the cathodic and for the anodic reactions. Cathodic compression of hydrogen, used to accomplish separation of pure water from humidified hydrogen, requires an additional energy input, independent of the cell current density.

FIG. 8 illustrates the additional voltage, $V_p$, required for electro-chemical hydrogen compression, which can be calculated from the formula presented in Eqn. 8:

$$V_p = 0.059 \log P_c/P_a \qquad \text{Eqn. 8}$$

where $P_c$ is the hydrogen pressure at the cathode and $P_a$ is the hydrogen pressure at the anode. A number of different types of electrodes are suitable for use in the electro-osmotic cell of the present invention. Such electrodes, and the electrode materials, should be conductors, should be capable of adsorbing hydrogen and should also act as catalysts for the electrode reaction. Suitable electrode materials include metals of Group VIII of the Periodic Table such as rhodium, palladium, iridium and platinum. Other suitable metals include nickel, copper, etc. In addition suitable electrodes can be formed from metal oxides, or from carbon which is activated with platinum or palladium, or with oxides of iron, magnesium, cobalt, etc. These electrode materials may be used in sheet form, or in the form of screens, meshes, or other types of porous bodies. Furthermore, these electrode materials may be used as slurries.

The process described in this invention may also use oxygen reactions to promote electro-osmotic water transport. When oxygen is the gas used as the carrier, two different reactions may be utilized. For example, a cation exchange membrane may be utilized between the electrodes, in which case a hydrogen ion is conducted through the membrane from the oxygen-output side to the oxygen-input side. Water is transported in the direction of proton flow, therefore a supply of water to the oxygen-output side will eventually appear at the oxygen-input side. Here the reactions are:

at the cathode or oxygen-input side $$\tfrac{1}{2} O_2 + 2 H^+ + 2 e^- \rightarrow H_2O \qquad \text{Eqn. 9}$$

at the anode or oxygen-output side $$H_2O \rightarrow \tfrac{1}{2} O_2 + 2 H^+ + 2 e^- \qquad \text{Eqn. 10}$$

Those skilled in the art will appreciate that the overvoltages resulting from these reactions are large, therefore the process will require energy inputs considerably larger than the processes using hydrogen as the water carrying vehicle. However, these energy requirements may be considerably reduced if an anion exchange membrane is utilized for the oxygen-based process, in which case hydroxyl radicals are the transported ion.

The reactions are as follows:

at the cathode $$O_2 + 2 H_2O + 4 e^- \rightarrow 4 OH^- \qquad \text{Eqn. 11}$$

at the anode $$4 OH^- \rightarrow O_2 + 2 H_2O + 4 e^- \qquad \text{Eqn. 12}$$

Here again, overvoltages are large, as compared to quasi-reversible hydrogen electrodes in presence of a cation exchange membrane. Furthermore, these electrochemical processes involve water electrolysis, an energy-consuming process, whereas the hydrogen-based process only requires hydrogen oxido-reduction, a low energy-demanding process. The following Examples are illustrative of the invention and should not be considered as limiting in any way.

EXAMPLE I

This Example is directed to the desalination of salt water. The apparatus setup as shown in the accompanying FIGS. 2, 4, 5 and 6 and described above is employed. The electro-osmotic water desalination system, using salt water at 15° C, has a production rate of 1,000 gallons of purified water per day. The total system has an encumbrance of about 1.5 cubic feet, and comprises an electro-osmotic cell with a cross-sectional area of 0.5 square feet. To achieve this daily production volume, 110 single cells are stacked in a filter-press type of arrangement with a linear cell density of 4 cells per linear inch. A stack height of 2 feet is obtained. For a water transport number of 8 molecules of water per proton, a current density of 500 Amperes per square foot and a cell resistance of 0.1 ohm-cm², a total transfer area of 55 square feet is adequate for the desired daily production volume, equivalent to 18 gallons of pure water per square foot per day. The water recovery system at the cathode is designed to operate at a pressure of 8 atmospheres.

EXAMPLE II

Employing an apparatus setup similar to that used in Example I, employing brackish water at 15° C, for a water transport number of 6 molecules of water per proton, a current density of 800 Amperes per square foot and a cathode pressure of 10 atmospheres, a pure water production rate of 1,000 gallons per day with an electro-osmotic cell comprising 140 cells of 0.5 square foot cross-sectional area, is obtained. These operating conditions require about 70 square feet of transfer area, resulting in an electro-osmotic cell stack encumbrance of 1.5 cubic feet. The flux rate of water is equivalent to 21.6 gallons of pure water per square foot per day.

EXAMPLE III

Employing an apparatus setup similar to that described in Example I a water purification system is designed for the production of 30,000 gallons/day of pure water from sea water at 15° C. The water recovery is operated at 10 atmospheres for a water transport number of 6 and a cell resistance of 0.1 ohm-cm$^2$. The total transfer area of 2,250 ft$^2$ is required, resulting in 1,000 single electro-osmotic cells with a cross-sectional area of 2.25 ft$^2$, a stacking factor of 8 cells/inch and a total encumbrance of 23 ft$^3$. Maintenance is faclitated by dividing the electro-osmotic units into two identical batteries of 500 cells each and a battery height of 5 ft. each. The water flux in the apparatus is equivalent to 13.5 gallons/ft$^2$/day, the cells being operated at 500 amperes/ft$^2$.

What is claimed is:

1. A process for removing water from an aqueous solution which comprises: treating the aqueous solution stream with hydrogen to cause hydrogen mixing with the aqueous solution, electrochemically treating the aqueous solution-hydrogen mixture in an electro-osmotic cell contaning a cation exchange membrane or porous diaphragm to preclude short circuits and reaction product mixing therein, a hydrogen anode and a hydrogen cathode, applying a direct current potential across said cell causing hydrogen to undergo an oxido-reduction process while entraining water from the aqueous solution stream to the cathode, recovering water from hydrogen released at said cathode through electrochemical hydrogen compression means, allowing hydrogen to be recycled and recovering the water.

2. A process for obtaining relatively pure water from salt-containing water which comprises: treating the salt-containing water stream with hydrogen to cause hydrogen mixing with water, electrochemically treating the water-hydrogen mixture in an electro-osmotic cell containing a cation exchange membrane or porous diaphragm to preclude short circuits and reaction product mixing therein, a hydrogen anode and a hydrogen cathode, applying a direct current potential across said cell causing hydrogen to undergo an oxido-reduction process while entraining water from the impure water stream to the cathode, recovering water from hydrogen released at said cathode through electrochemical hydrogen compression means, allowing hydrogen to be recycled and recovering pure water.

3. A process in accordance with claim 2 wherein the cathode of said electrochemical cell comprises a stationary electrode and the anode compartment comprises means for mixing of hydrogen and water.

4. A process in accordance with claim 2 wherein the cathode of said electrochemical cell comprises a stationary electrode and the anode compartment comprises a metallic cell compartment and the slurry electrode in the form of the aqueous slurry of particulate matter having hydrogen adsorbed thereon, said metallic cell compartment functioning as a current collector and site for hydrogen adsorption adjacently to water.

5. A process in accordance with claim 2 wherein the electrochemical cell becomes a gas compression means for separation of water from hydrogen, said compression being achieved by application of a bias voltage between electrodes of said electrochemical cell.

* * * * *